Oct. 10, 1939.   P. S. PITTENGER   2,176,042
CONTAINER FOR LYOPHILIC BIOLOGICALLY ACTIVE SUBSTANCES
Filed June 25, 1936
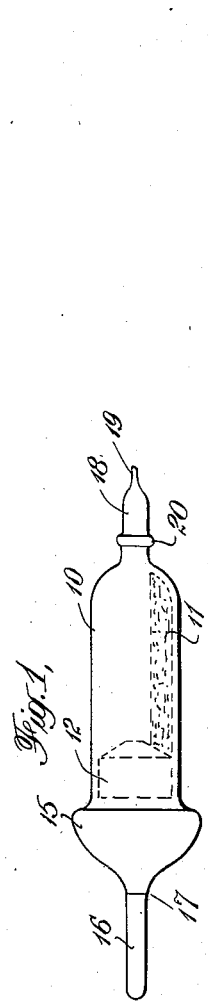
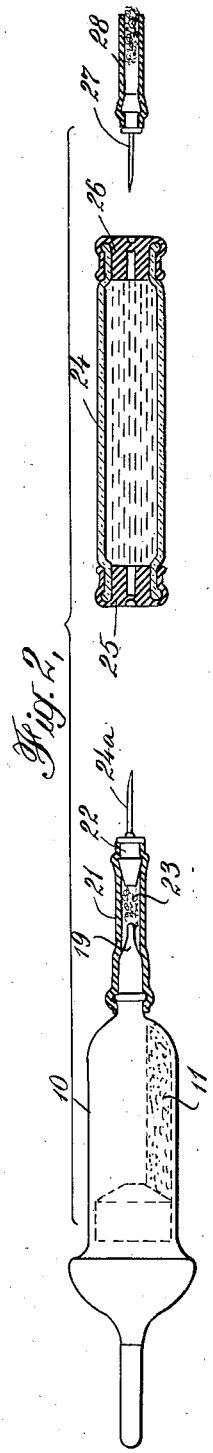
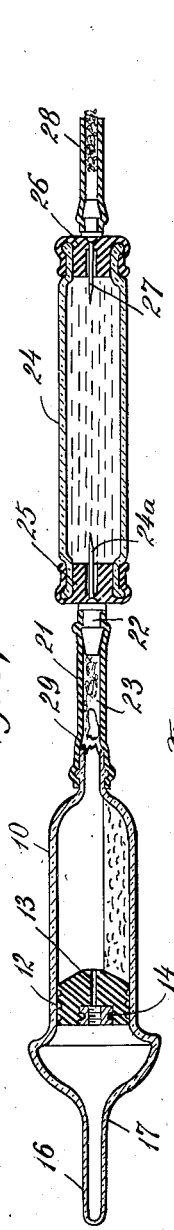
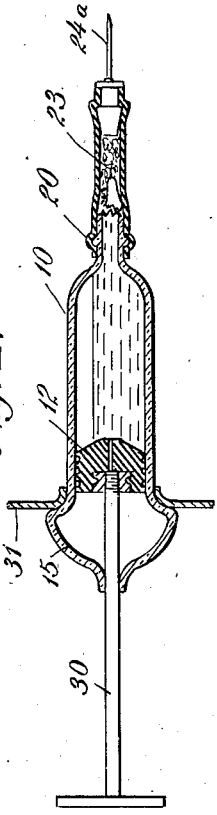
INVENTOR
Paul S. Pittenger
BY
Pennie Davis Marvin & Edmonds
ATTORNEYS Patented Oct. 10, 1939

2,176,042

UNITED STATES PATENT OFFICE 2,176,042

CONTAINER FOR LYOPHILIC BIOLOGICALLY ACTIVE SUBSTANCES

Paul S. Pittenger, Philadelphia, Pa., assignor to Sharp & Dohme, Incorporated, (1929), Philadelphia, Pa., a corporation of Maryland Application June 25, 1936, Serial No. 87,320

1 Claim. (Cl. 128—272)

The present invention relates to improvements in the preservation of biologically active substances, such as sera, protein solutions, bacterial cultures, viruses and other labile biological substances; and it relates more particularly to improvements in the containers in which such materials are distributed and stored under a vacuum after treating such substances, by freezing and dehydration under a high vacuum, to produce a desiccated substance, which containers are provided with means by which water or other aqueous liquids can be readily introduced into the containers without destroying the vacuum to restore the desiccated substance to a liquid condition suitable for use, and with means by which the container may be used as a syringe for the injection of the restored material, thus combining in a single container both the means for storing and distributing the substances and for using the substances when desired.

Biological substances, as now commonly distributed and marketed, are packaged and sealed in a liquid state. Products so marketed and distributed tend to deteriorate and to lose their biological properties, and the marketing of such products in such form involves a serious economic loss, both because of the loss of biological activity or potency of the products between the time of manufacture an dthe time of use, and because of the large proportion of such products which must be discarded because of deterioration on storage. Such products are commonly sold with a fixed expiration date after which they are not to be used, and a large proportion are not used before their expiration date has passed and must be discarded.

It has been proposed to improve the stability and keeping properties of serum and other biological products by freezing such products and drying, that is, removing water from, the frozen products under a high vacuum, both in bulk and final containers. It has also been proposed to seal such products, after desiccation, in containers under a high vacuum, as by the use of containers having perforable closures to permit the introduction of water into the containers, as by means of a hypodermic needle, without destroying the vacuum to enable the material to be restored to a liquid state suitable for use. Such desiccated material is very porous and it is desirable to package and distribute it under a vacuum, both to prevent any deterioration which might be caused by contact with the air, and to facilitate the dissolving of the material in water or other aqueous fluid when restoration is desired. If the material is maintained under a vacuum, and water is introduced into the container before the vacuum is broken, the vacuum tends to pull the water into the pores and interstices of the material, insuring intimate contact of the water with the material and preventing the material from being impregnated with gas which might tend to prevent the ready access of water to the interior portions of the desiccated material. Methods of producing such desiccated biologically active substances, in final containers, sealed under a high vacuum in containers provided with perforable closures have been developed by Dr. Reichel of the Mulford Laboratories, and Dr. Flosdorf, of the University of Pennsylvania. It has also been proposed to store desiccated biologically active substances in sealed glass ampoules.

In all procedures as have heretofore been proposed for the storage of such materials in containers provided with a glass seal, the method of restoration used involves breaking the glass seal and destroying the vacuum. When the vacuum is destroyed by the breaking of the seal in order to permit the introduction of water, the material, which is very porous and has an immense network of fine pores or capillaries, tends to become airbound and does not dissolve readily in the water or aqueous liquid used, and must be shaken vigorously or allowed to remain in contact with the water for a considerable period of time, or both, before it dissolves.

The methods heretofore proposed for the sealing of such desiccated biologically active substances in a container provided with a perforable closure have the disadvantage that the perforable seals used are not sufficiently vacuum-tight, and moisture-tight, to insure the maintenance of a high vacuum within the container, to facilitate the restoration of the material to a liquid state, and to prevent the ingress of moisture. The desiccated materials under consideration are very hygroscopic, having a distinct tendency to absorb moisture, even from air of relatively low humidity and, after absorption of moisture, tend to deteriorate. The keeping properties of the material depend to a marked extent upon the degree of desiccation, and any means of sealing the material within a container which does not prevent the ingress of moisture, even in small amounts, with complete reliability, is not altogether satisfactory.

In my copending application Serial No. 87,319 filed June 25, 1936, I have described a glass container in which the desiccated biologically active substances are hermetically sealed under a vacuum by means of a glass seal, which is vacuum-tight and moisture-proof, and which is provided with means by which water or other aqueous liquid may be introduced to restore the desiccated material to a liquid state without breaking the vacuum within the container. In that application, the means provided to enable the introduction of water without breaking the vacuum within the container comprise a rubber cap which fits over the flame sealed neck of the container and which contains a small amount of a filtering material, such as absorbent cotton. To restore the desiccated substance to a liquid state, as described in that application, it is merely necessary to pass a hollow needle through the end of the rubber cap, break the glass seal under the rubber cap, and introduce water into the vessel through the hollow needle, the vacuum within the container sucking the water in and insuring that the water penetrates into the porous desiccated substance to rapidly dissolve it.

In accordance with the present invention, I provide a container, cylindrical in shape, provided with a sealed glass neck similar to the neck of the container described in my said prior application, and with suitable means for the introduction of water into the container without breaking the vacuum within the container, which is further provided with a suitable plunger, sealed within the container, which may be used to force the liquid material out of the container after it is restored, thus making the container available not only for the storage and distribution of the desiccated material, but also available as a hyodermic syringe for the injection of the material after restoration.

The size of the container may be varied widely, its capacity being determined by the amount of material which it is intended to contain, and being advantageously such that it contains a unit portion of the material, that is, the proper amount for a single injection. As the amount of material suitable for use in a single injection varies with different biologically active substances, and with the uses for which they are intended, the capacity of the container may vary from a cubic centimeter or less to as much as 50 or 100 or more cubic centimeters. The volume of the container, however, must be somewhat more than twice as great as the volume of the material intended to be processed therein, in order to provide adequate surface for the sublimation or evaporation of water therefrom. Thus if unconcentrated material is processed in the container, the container must have a volume of about twice the volume of the final restored product, whereas if concentrated material, such as material which has been concentrated to about one-half volume in a suitable manner, is processed within the container, the container may have an amount of desiccated material within it which on restoration to its normay liquid condition about fills the container. The neck of the container must be of sufficient size to permit the free flow of water vapor during the desiccation process. In carrying out the desiccation, the material is originally frozen by exposure to a refrigerant maintained at a very low temperature, and is then subjected to the action of a high vacuum, the heat absorbed during the sublimation or vaporization which takes place being sufficient to maintain the material in a frozen state despite the flow of heat into the material from the atmosphere or surroundings. In order to maintain the sublimation or vaporization at a sufficiently rapid rate to prevent the melting of the material, it is necessary to provide an adequately large passageway for the vapors, and to avoid the use of vapor passages of too small a lumen, or with too many constrictions.

The container is advantageously produced from a glass cylinder, open at one end and provided with a neck of suitable dimensions, as described above, at the other end. Into the open end of the container is introduced a suitable rubber plug, adapted to form the piston of the hypodermic syringe into which the container is subsequently converted, provided with a threaded metal bushing into which the plunger of the syringe may subsequently be screwed. A small passage through the center of this rubber plug is provided. After the rubber plug is inserted into the open end of the cylinder, a neck or tube is drawn at this end of the cylinder, and flame sealed. This neck is subsequently to be broken off to permit the screwing of a hypodermic plunger to the rubber plug, and the constricted portion formed where this neck is broken off serves as a guide for the plunger. A bulge may advantageously be provided at this end of the container to provide a support for a finger rest. Also, a small bulge may advantageously be provided in the other neck of the container near the point where the neck flares into the container proper to help hold a rubber connecting tube and needle which fits over this neck of the container in place.

Into the container so provided is introduced the proper amount of biologically active substance to be treated, and this substance is then frozen, preferably while the container is in a more or less horizontal position to insure a maximum exposed surface for sublimation, and by exposure to a refrigerant maintained at a very low temperature, e. g. —70° C. In introducing the material into the container, care should be taken that it does not block the small passage which is provided at the center of the rubber plug, and which serves as a passageway for air or vapors from the portion of the container in back of the plug to the portion in front of it. The container is then attached to a vacuum manifold and subjected to the action of a high vacuum to remove the water from the frozen material. After the desiccation has proceeded to the desired extent, the neck of the container is sealed by means of a flame. This sealing may be done without breaking the vacuum, and while the container is still attached to the vacuum manifold, but preferably the container is removed from the vacuum manifold, and the interior of the container allowed to assume atmospheric pressure, after which the neck is drawn in part to a fine tube, the container is once more evacuated, as by connecting it again to a vacuum manifold, and is then flame sealed at the point where it has been drawn to a fine tube. It is advantageous to draw a portion of the neck at the point of sealing to capillary dimensions, or to a fine tube, before sealing, as this simplifies the sealing operation, and insures the production of a vacuum-tight seal, without risk of puncturing the glass, as frequently occurs when tubes of relatively large diameter, such as are used for the necks of the containers, are flame sealed under a vacuum.

When the container is thus sealed while a vacuum is maintained within it, not only is the compartment which contains the desiccated material evacuated, but also the compartment behind the rubber plug, as the small passage through the plug permits any air or gas contained in this portion to pass out into the vacuum device.

By providing the rubber plug with a small hole or air passage, not only may the container be provided with a plug adapted to serve as a hypodermic syringe piston and still be entirely evacuated and flame sealed, but also the sterilization of the container prior to introducing into it a biologically active substance to be desiccated is facilitated. In producing the desiccated biologically active substances, it is of course essential that the materials when processed be aseptic, and that the containers be sterilized before use. The method of sterilizing these containers which is advantageously used is steam sterilization. A container, after assembling and prior to the introduction of the biologically active substance to be processed, is placed in a vacuum chamber to remove the air from it, and live steam is then introduced into the chamber. This steam penetrates to every portion of the container, and sterilizes it. After the necessary period of exposure to the live steam, the chamber is again evacuated so that all traces of moisture are removed. If the rubber plug in the container were not provided with a passage, the steam could not penetrate into the portion of the container behind the rubber plug and the container could not be rendered aseptic by means of steam sterilization. In order to sterilize this portion of the container, if the rubber plug were not provided with a hole which permitted the passage of air and steam, it would be necessary to subject the containers to such a drastic heat treatment as might seriously damage the rubber plug, and render it incapable of use as a piston. Thus the small air passage in the rubber plug serves not only to permit the evacuation of the portion of the container behind the plug prior to the final sealing of the container, but also greatly facilitates and renders feasible the sterilization of this portion of the container.

The desiccated material is thus produced within the container as a formed porous mass, having the shape and volume of the frozen material from which it is produced, and without change in its physical structure after desiccation, having an immense network of capillaries or pores, and sealed within the container under a high vacuum by an all-glass seal. Over the sealed neck of the container is placed a rubber connecting tube having the arrow-head hub of a hypodermic needle inserted in the opposite end. A small pad of absorbent cotton or other suitable filtering material is provided in the connecting tube. This tube is of proper size to form a tight connection with the container neck and the hub of the needle, and to prevent the leakage of air into the container after the glass seal is broken, for such short periods of time as required in restoring the material.

In order to restore the desiccated material to a liquid state, and to use it for injection purposes, it is merely necessary to break the end of the glass seal with the fingers, and allow water to flow through the needle into the container. The vacuum, which is maintained in the container by the glass seal during storage, etc., and during the short period of restoration by means of the rubber tube, quickly sucks the water into the container and insures its rapid penetration into the desiccated material and the rapid solution of it. After the material is dissolved, the other neck of the container is broken off, a plunger is screwed into the bushing provided in the rubber plug, a finger rest is slipped over the container, and the container thus serves as a hypodermic syringe which may be used for injection purposes in the usual way. The cotton or other filtering material within the rubber cap serves to filter the restored material as it is forced from the container, and to prevent any particles of broken glass from entering the syringe needle.

The invention will be further illustrated and explained in connection with the drawing, which illustrates a container with the desiccated material in it, and the rubber tube and other means used in restoring the material and in converting the container into a hypodermic syringe.

In the drawing,

Fig. 1 illustrates a glass container containing the desiccated material and provided with a rubber plug adapted to act as a piston;

Fig. 2 illustrates the same container fitted with a rubber connection or tube and needle and also shows means by which water may be introduced into the container without breaking the vacuum, the parts being separated;

Fig. 3 illustrates the container with means for restoring the material assembled, and with the glass seal broken; and Fig. 4 illustrates the container after the restoration of the material and adapted for use as a hypodermic syringe.

In Fig. 1, 10 represents a container of suitable size intended for the marketing and distribution of a desiccated serum or other biologically active substance, containing a frozen and desiccated biologically active substance 11, and adapted to be converted into a syringe for the injection of the serum or other substance after it is restored to a liquid state. The container is provided near one end with a rubber plug 12, the detailed construction of which is shown in Fig. 3. This rubber plug has a small air hole 13 through the center and also has a threaded metal bushing 14 vulcanized in it. This bushing is adapted to permit the fastening of a syringe plunger to the plug. The container is also provided, at the end near which the plug is placed, with a bulge 15 adapted to serve as a support for a finger rest, and with a sealed neck 16, adapted to be broken off at the etched or scratched part 17 to permit the plunger to be screwed into the rubber plug. At the other end of the container there is provided a neck 18 of suitable size to permit the ready flow of water vapor, which is flame-sealed, after the material is desiccated and while a vacuum is maintained within the container, as shown at 19. This neck may also be provided with a bulge 20 to aid in holding in place the rubber tube which is subsequently placed over the neck.

The desiccated biologically active substance is produced in the container by introducing into it a suitable amount of a liquid biologically active substance, freezing the liquid substance as by exposure to a refrigerant maintained at a very low temperature, e. g., −70° C., while the container is in a more or less horizontal position to provide a maximum surface area of the frozen material and to prevent the frozen material from blocking up the hole provided in the rubber plug. The container is then attached to a vacuum manifold or pump by means of neck 18, and the frozen water removed from the substance by evaporation or sublimation, by means of the high vacuum at a rate sufficient to prevent the material from assuming a liquid or gelatinous condition. The neck 18 of the container must be sufficiently large so that a free flow of water vapor is obtained, so that the cooling effect of the vaporization or sublimation is sufficient to prevent the melting or softening of the material during the desiccation.

After the desiccation has proceeded to the desired extent, the neck 18 is flame-sealed, either while the container is attached to the vacuum manifold or pump or after removing the container, drawing the neck to a fine tube, and re-evacuating the container. In any case, the sealing of the neck is accomplished while a vacuum is maintained within the container. The hole 13 in the rubber plug permits the evacuating not only of the portion of the container where the desiccated material is, but also the portion of the container behind the rubber plug.

After the desiccated substance is produced, and sealed under a high vacuum as shown in Fig. 1, a rubber tube or connection 21, which tightly embraces the neck 18, and in one end of which is inserted the hub of a hypodermic needle 24a, is placed on the neck as shown in Fig. 2. This rubber tube or connection contains a suitable filtering material, such as absorbent cotton 23. The rubber tube and the needle may be advantageously protected from contamination and deterioration by providing a glass cap (not shown) for it, which will prevent contact of dust and air with the needle and rubber connection or tube and which may be easily removed when it is desired to use the material in the container, or the rubber connection or tube and the needle may be provided separate from the container, to be placed on the container when desired.

To restore the material, there may be advantageously provided a suitable container or tube 24 for the water or other aqueous liquid used to restore the material. This container may be a glass tube open at either end and provided with perforable stoppers 25 and 26 at the ends. Another needle 27, and a suitable air filter 28 attached thereto is also provided.

To restore the material to a liquid state, the needle 24a is forced through the perforable stopper 25 of the container 24. Needle 27, with its attached air filter 28, is forced through the other perforable stopper of the container 24. The arrangement illustrated in Fig. 3 is thus obtained. The sealed tip 19 of the neck 18 of the container 10 is then broken as shown at 29, as by the fingers, whereupon the vacuum in the container 10 sucks the water from the container 24 into container 10, so that the water quickly wets the desiccated material, thoroughly penetrating the pores and interstices of the desiccated material, and rapidly dissolving it. The amount of water in the container 24 may advantageously be that which should be added to insure that the restored material has the proper concentration and is not sufficient to fill the entire portion of the container containing the desiccated material. By holding the contaner in a nearly vertical position with the end to which the rubber tube and needle is connected down, the water will enter the container and penetrate into, and wet, the desiccated material almost instantaneously, and air will then enter the container and break the vacuum in both portions of the container before the liquid reaches the rubber plug, and before any liquid is sucked into the portion or compartment behind the plug.

The air hole 13 in the rubber plug 12 is so small that no substantial amount of water or restored substance passes through this hole into the portion of the container behind the plug, even though the container is shaken to aid in dissolving the material, if the vacuum is broken after the introduction of liquid as described. An advantageous method of restoring the material is to insert the air filter in one end of the vial containing the water or other liquid, and then to pass the needle attached to the container through the stopper in the other end, and to hold the combined apparatus, with the plug end of the container, and the air filter end of the vial, up, more or less in a U-shape, with the rubber tube or connection forming the bend or bottom of the U. When held in this position, the glass tip of the container within the rubber tube is broken, and the water is sucked into the container by the vacuum. The amount of liquid in the vial is regulated so that the proper amount of water enters the container, and so that air will enter the container and break the vacuum before the level of the liquid in the container reaches the rubber plug, and before any of the liquid can be sucked through the air passage into the space behind the plug.

After the material is restored to a liquid state, the tube 24 is removed and the neck 16 is broken off at the etched portion 17 and a suitable plunger 30 screwed into the metal bushing of the rubber plug 12, as shown in Fig. 4. The constricted portion of the container where the neck 16 is broken off serves as a guide for this plunger. A finger rest 31 is then slipped over the container to rest against the bulge 15. The container is thus converted into a syringe suitable for use for the injection of the restored material. When the material is forced out of the container for injection, the filtering material 16 provided in the rubber cap will effectively filter the material and also prevent any small particles of glass from passing out through the needle along with the liquid material.

The container thus provided is adapted for the distribution of the desiccated, biologically active substance in unit amounts suitable for injection purposes. Advantageously, the container may be marketed and distributed as a sealed glass container without the rubber connection and needle attached thereto; and the rubber connection and needle, and the needle and attached air filter used to permit the entrance of air into the container for water or aqueous liquid may be sealed in a suitable vial to protect the rubber parts from deterioration. Thus when it is desired to use the biologically active substance, it is merely necessary to remove the rubber connection and needle and other devices from the sealed vial, slip the rubber connection over the neck of the container so that it tightly embraces it and proceed to restore and use the material as described above. All such operations, of course, should be conducted under aseptic conditions.

It will thus be seen that by the present invention I provide desiccated biologically active substances in a container having an all-glass seal under a high vacuum such that the material is effectively maintained under a vacuum and effectively preserved from the effects of moisture or any contaminating agents, and yet may be restored to a liquid state by the addition of water or other aqueous liquid while the desiccated material is maintained under a vacuum, so that the restoration to a liquid state is simplified and speeded up, the container being such that it is adapted for use, after the material is restored to a liquid state, as a hypodermic syringe for injection purposes.

I claim:

As a new article of manufacture, a flame-sealed evacuated glass container, divided into two compartments by a plug adapted to serve as a piston, said plug having a small passage through it connecting the two said compartments, whereby the pressure in each of said compartments is the same, one of said compartments containing a desiccated biologically active substance in the form of a formed porous mass having substantially the shape and volume of the frozen substance from which it is made.

PAUL S. PITTENGER.